United States Patent [19]

Ishii

[11] Patent Number: 4,800,452
[45] Date of Patent: Jan. 24, 1989

[54] DISK RECORDING AND REPRODUCING HEAD SYSTEM HAVING TRACK SEEKING FOR FAULTY ADDRESSES

[75] Inventor: Tsuneo Ishii, Saitama, Japan

[73] Assignee: Pioneer Electronic Corporation, Tokyo, Japan

[21] Appl. No.: 920,497

[22] Filed: Oct. 20, 1986

[30] Foreign Application Priority Data

Oct. 18, 1985 [JP] Japan .................................. 60-159569

[51] Int. Cl.⁴ .............................................. G11B 21/08
[52] U.S. Cl. .................................... 360/78.14; 369/32; 371/7; 371/10
[58] Field of Search ............................. 360/78; 369/32

[56] References Cited

U.S. PATENT DOCUMENTS 4,413,292 11/1983 Sugiyama et al. ..................... 369/32
4,428,074 1/1984 Abe et al. ................................ 369/32
4,536,863 8/1985 Giddings ................................ 369/32
4,706,133 11/1987 Giddings ................................ 369/32

Primary Examiner—Alan Faber
Assistant Examiner—David L. Robertson
Attorney, Agent, or Firm—Sughrue, Mion, Zinn, Macpeak, and Seas

[57] ABSTRACT

A head system for a disk on which address data are recorded on the disk. A head is first driven to an intended track and an attempt is made to read the address. If the address is not successfully read in a predetermined time, corresponding to the tracing of predetermined number of tracks, the head is driven in one radial direction and address reading is again attempted for the predetermined time. If again the address reading is unsuccessful, the head is driven in the opposite radial direction. The alternating head movement is continued until an address is successfully read.

7 Claims, 3 Drawing Sheets

DISK RECORDING AND REPRODUCING HEAD SYSTEM HAVING TRACK SEEKING FOR FAULTY ADDRESSES

BACKGROUND OF THE INVENTION

1. Field of the Invention

This invention relates to a disk recording playback for recording and playing back data on and from disks such as video disks, digital audio disks, optical disks and magnetic disks.

2. Background of the Invention

Optical disks capable of recording and playing back data at high density are gaining widespread acceptance. Such a disk has spiral tracks (or guide tracks) formed thereon. Address data is recorded in positions throughout the disk so that the data may be recorded on and played back from the set position of the track. When the desired address is designated, the conversion means (reading or writing head) for recording and playing back data on and from the disk is driven (tentatively sent) to the desired address and, on reaching a position at least close to the designated address, it sequentially traces the tracks one after another or jumps over several tracks at a time (precisely sent) to gain access to the designated address.

When the head is first tentatively to a position close to the desired address, the actual position must be first read to determine the direction of and the distance to the designated address. In case the presently - positioned address is unavailable for a certain reason, the head is conventionally made to trace tracks until the actual address becomes readable or it is tentatively sent in a fixed direction to allow it to read out another address located close to a new position. In the case of track tracing, it takes a long time until the actual position is read if there is a relatively large dropout near the actual position, whereas in the case of the fixed displacement, it may read out an address whose position is shifted relatively far from the initial position.

SUMMARY OF THE INVENTION

Accordingly, an object of the invention is to provide a method of efficiently repositioning a recording or reading head on a disk when the initial track address is unreadable.

According to the invention, the head is driven to near the desired track and an attempt is made to read the track address. If the initially positioned track has an unreadable address, the head is alternately moved in the inward and outward directions until a readable address is found.

DETAILED DESCRIPTION OF THE PREFERRED EMBODIMENTS

Figure 1:
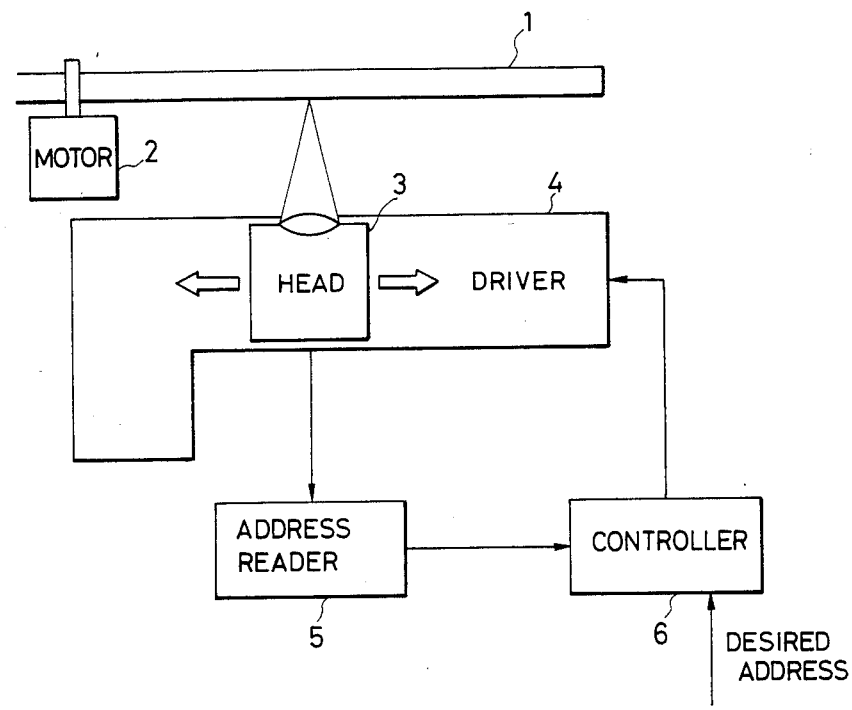
FIG. 1 is a block diagram of a disk recording head system embodying the present invention.

FIG. 1 is a block diagram of a disk recording head system embodying the present invention. In FIG. 1 there is shown an arrangement of a disk 1 which is rotated by a motor 2 at a predetermined speed (e.g., 750 rpm). A conversion means (head) 3 converts an electric signal into light which is focused on recorded data on the disk 1. The head 3 then converts the reflected light that it receives into an electric signal to reproduce the data. A driver 4 drives the head 3 in the redial direction of the disk 1. A reading means 5 reads address data out of the playback signal produced by the head 3 and supplies the data related to the actual position to a controller 6. The controller 6 controls the driver 4 in correspondence to the address received from and designated by an input means (not shown) and thus drives the head 3 toward the designated address from the detected actual address. In normal track tracing, the controller 6 uses reflected light in a feedback control loop to follow the spiral track.

Figure 2:
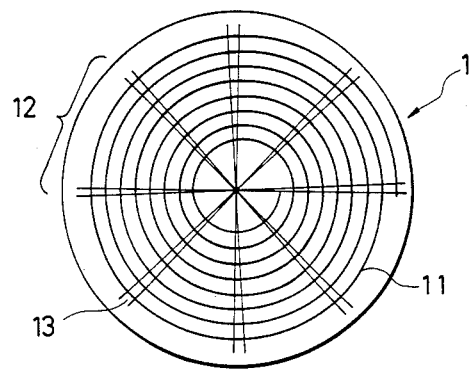
FIG. 2 is a typical plan view of the disk.

As shown in FIG. 2, the disk 1 has spirally - formed tracks 11 on which data is recorded and the tracks 11 are divided into the specified number (eight in the embodiment shown) of sectors 12. Addresses are recorded in an address record 13 provided at the head of each sector 12.

Figure 3:
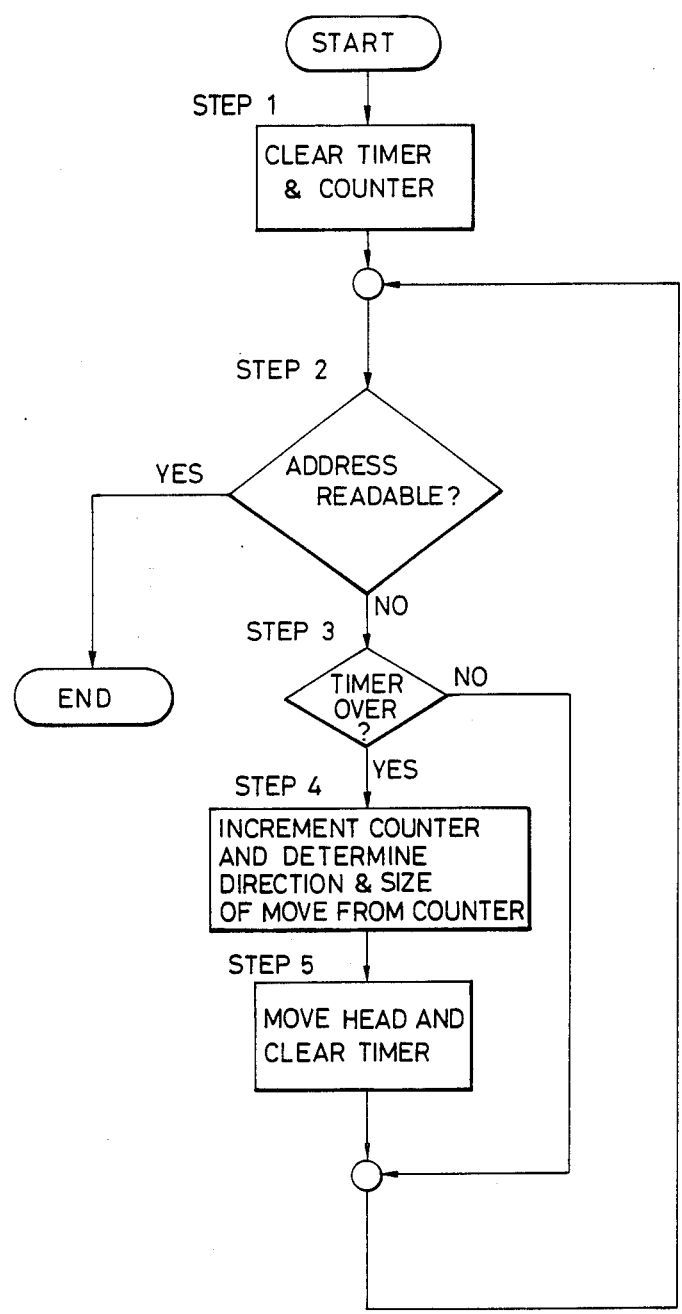
FIG. 3 is a flowchart therefor.

Referring now to a flow chart shown in FIG. 3, the function of the disk recording head system will be described. When an address to which access should be gained is received from an unshown circuit, the controller 6 tentatively sends the head to the designated address (as described before) and initially clears a timer and a counter (not shown) contained therein and causes the timer to start its clocking operation (Step 1).

Subsequently, the controller 6 reads address data on the actual position of the conversion means 3 out of an output signal from the address reader 5. The controller 6 terminates the sequence when the address signal has been successfully read out and moves to the next step when the data proves unreadable (Step 2).

When the address is unreadable, the timer is tested to determine whether it is within a predetermined time (e.g., 240 ms) and, if it is within that time, the reading operation is repeated from the reading step 2. In other words, the head 3 sequentially traces the tracks. After the lapse of the predetermined time in step 3, the next step 4 is executed.

When the address is not read within the predetermined time, in step 4, the counter value n is incremented by one. The direction of movement and the movement magnitude of the head 3 are computed from the above value of n. When the counter value n is odd, the direction of movement is defined as being in the inner peripheral (inward) direction of the disk 1 and the movement magnitude (the number N of tracks moved) is obtainable from the equation $N=3n+3$. When the counter value n is even, the direction of movement is defined as being in the outer peripheral (outward) direction thereof. In this case, the movement magnitude (the number N of tracks moved) is obtainable from the equation $N=3n-3$. One turn of the disk is counted as one track.

When the direction of movement and the movement are computed, the controller 6 supplies a control signal corresponding to the result computed to the driver 4 and causes the head 3 to move. After the head 3 is moved in step 5, the timer is again cleared and the operation is repeated starting with step 2.

Figure 4:
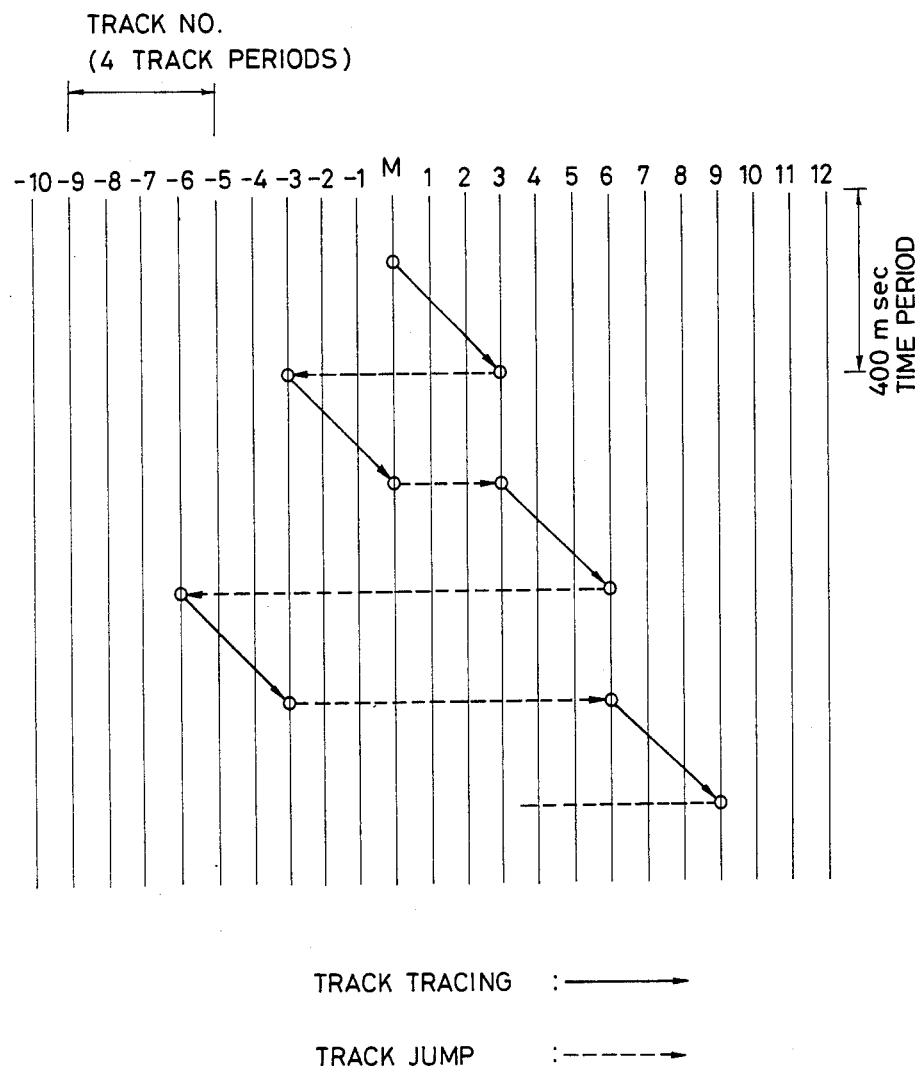
FIG. 4 is a plan view showing the state of the conversion means moving on the disk.

FIG. 4 shows the above movement in the head 3 relative to the disk 1. In other words, given that the head 3 is initially located at track number M, the head 3 starts the operation of reading the actual address out of the track M when an intended address is designated.

When no address is readable after the predetermined time lapse of 240 ms, the head 3 is already located three tracks to the outside (provided that the head 3 traces the tracks from the inner to the outer periphery of the disk 1). This three track displacement occurs since the disk 1, which is rotating at a speed of 750 rpm, turns three times during 240 ms. The counter value n, which is set at 1, causes the head 3 to move (jump) to the inner side of the tracks by 6 (=3×1+3) tracks, i.e., to be positioned three tracks inside the initial track M.

Then, the tracks starting with the above track M-3 are traced during 240 ms and their addresses are read. In the case that no address can be read even after the passage of the subsequent 240 ms, the head 3 is so arranged as to be positioned just at the track M, The head 3 then jumps 3 (=3×2−3) tracks in the outer direction because the counter value n at that time is incremented by one to become 2. This jump returns the head 3 to the track located three tracks on the outside from the initial track M, which is also used as a basis for the jump. The head 3 maintains the reading operation for 240 ms (three tracks) starting with the track M+3. If the address reading is not successful, the counter value n is incremented to 3. Accordingly, the head 3 jumps to the inside by the 12 (=3×3+3) tracks, from which it keeps reading for 240 ms. The head 3 thus alternately jumps toward the inner or outer periphery around the track M and traces the tracks without excess or deficiency. Consequently, the closest readable address to the initially positioned track M can be read with a tolerance of plus or minus 3 tracks.

When the sequence is repeated and the address data is successfully read out, the controller 6 computes the difference between the address read out and the designated track and controls the driver 4 correspondingly to the result obtained and further causes the head 3 to move (tentatively sent) to the target address. When the head 3 reaches the track close to the target one, it reads out the address of the track. In case the address cannot be not read out, the above operation may be reexecuted.

When the intended address is read out, the controller 6 allows the head 3 to play back the data recorded in the sector of the address or to record the predetermined data in the sector.

Although the time required to read out the address is set to be equivalent to what is required to trace the three tracks, it can be made longer or shorter. However, the tracing time for the purpose should preferably be an integral multiple of the time required to turn the disk 1 by one revolution. Moreover, the tracing time may be made variable within one sequence. The operation of reading out the address in such a sequence may be set independently to that of gaining access to the target address. Moreover, the present invention is applicable not only to the disk 1 having tracks formed spirally but also to a disk having tracks formed concentrically.

As set forth above, the disk recording playback according to the present invention comprises a conversion means (head) for recording and playing back data on and from a disk, a driver for driving the head in the radial direction of the disk, an address reader for reading address data recorded on the disk from a signal produced by the head and a control means for controlling the driver when the reader is unable to read out said address data and for driving the head alternately in the inner and outer peripheral directions of the disk. Thereby, address data in a position as close to the actual position as possible is read out by allowing the head to read out the address data by alternately driving the head in the inner and outer peripheral directions of the disk when the head is unable to read the address in the actual track.

What is claimed is:

1. A disk recording and reproducing head system, comprising:
   conversion means for playing back data from a disk;
   driving means for driving said conversion means in a radial direction of said disk;
   reading means for reading a plurality of address data recorded on said disk out of a signal produced by said conversion means; and
   control means for controlling said driving means when said reading means is unable to read out any of said address data to cause said driving means to drive said conversion means in alternating inner and outer peripheral directions of said disk.

2. A head system as recited in claim 1, wherein said control means includes a resettable timer, said reading means attempting to read said address data during a running of said timer, and said control means, after a lapse of said timer, causing said driving means to drive said conversion means in said alternating inner and outer peripheral directions and resetting said timer.

3. A head system as recited in claim 2, wherein said control means includes a counter, said control means incrementing said counter after said lapse of said timer and causing said driving means to drive said conversion means in one of said inner and outer peripheral directions according to the evenness and oddness of a value of said counter.

4. A head system as recited in claim 1, wherein said control means, when said reading means is able to read a first one of said address data, causes said driving means to drive said conversion means in correspondence to a difference between said first address data and a desired address.

5. A disk recording and reproducing head system, comprising:
   conversion means for playing back data from a disk;
   driving means for driving said conversion means in a radial direction of said disk;
   reading means for reading address data recorded on said disk out of a signal produced by said conversion means; and
   control means for controlling said driving means when said reading means is unable to read out said address data to cause said driving means to drive said conversion means in alternating inner and outer peripheral directions of said disk, wherein said control means includes a resettable timer and a counter, wherein said reading means attempts to read said address data during a running of said timer and wherein said control means causes said driving means to drive said conversion means in said alternating inner and outer directions, resets said timer, increments said counter after said lapse of said timer, causes said driving means to drive said conversion means in one of said inner and outer peripheral directions according to the evenness and oddness of said counter and causes said driving means to drive said conversion means by a distance determined from said value of said counter.

6. A head system as recited in claim 5, wherein an elapsed time of said lapsed counter corresponds to m rotations of said disk, and said distance N is alternately determined from said value n of said counter by two respective equations $N=mn+n$ and $N=mn-n$.

7. A disk recording and reproducing head system, comprising:

conversion means for playing back data from a disk;

driving means for driving said conversion means in a radial direction of said disk;

reading means for reading address data recorded on said disk out of a signal produced by said conversion means; and control means for controlling said driving means when said reading means is unable to read out said address data to cause said driving means to drive said conversion means in alternating inner and outer peripheral directions to a track of said disk not previously read by said reading means, wherein said control means includes a resettable timer and a counter, wherein said reading means attempts to read said address data during a running of said timer and wherein said control means, after a lapse of said timer, causes said driving means to drive said conversion means in said alternating inner and outer peripheral directions, resets said timer, increments said counter, and causes said driving means to drive said conversion means in one of said inner and outer peripheral directions according to the evenness and oddness of a value of said counter.

* * * * *